(12) United States Patent
Senior et al.

(10) Patent No.: US 10,438,581 B2
(45) Date of Patent: Oct. 8, 2019

(54) SPEECH RECOGNITION USING NEURAL NETWORKS

(71) Applicant: Google LLC, Mountain View, CA (US)

(72) Inventors: Andrew W. Senior, New York, NY (US); Ignacio L. Moreno, New York, NY (US)

(73) Assignee: Google LLC, Mountain View, CA (US)

( * ) Notice: Subject to any disclaimer, the term of this patent is extended or adjusted under 35 U.S.C. 154(b) by 1193 days.

(21) Appl. No.: 13/955,483

(22) Filed: Jul. 31, 2013

(65) Prior Publication Data

US 2015/0039301 A1 Feb. 5, 2015

(51) Int. Cl.
*G10L 15/16* (2006.01)

(52) U.S. Cl.
CPC .................................. *G10L 15/16* (2013.01)

(58) Field of Classification Search
CPC ....................................................... G10L 15/16
USPC .......................................................... 704/232
See application file for complete search history.

(56) References Cited

U.S. PATENT DOCUMENTS

| | | | | |
|---|---|---|---|---|
| 5,237,515 A * | 8/1993 | Herron | ............... | G01N 21/6428 702/30 |
| 5,903,863 A | 5/1999 | Wang | | |
| 5,946,656 A * | 8/1999 | Rahim et al. | .............. | 704/256.2 |
| 6,542,866 B1 * | 4/2003 | Jiang et al. | ................... | 704/255 |
| 7,610,199 B2 * | 10/2009 | Abrash et al. | ................ | 704/233 |
| 7,617,101 B2 * | 11/2009 | Chang | ..................... | G10L 15/16 704/232 |
| 8,386,251 B2 * | 2/2013 | Strom et al. | .................. | 704/246 |
| 8,484,022 B1 * | 7/2013 | Vanhoucke | .................... | 704/240 |
| 8,566,093 B2 | 10/2013 | Vair et al. | | |
| 2002/0156626 A1 | 10/2002 | Hutchison | | |
| 2003/0204394 A1 * | 10/2003 | Garudadri et al. | ........... | 704/201 |
| 2004/0024298 A1 * | 2/2004 | Marshik-Geurts et al. | .. | 600/326 |
| 2004/0102961 A1 * | 5/2004 | Jensen | .................. | H04H 20/31 704/201 |
| 2007/0271086 A1 * | 11/2007 | Peters et al. | ...................... | 704/9 |

(Continued)

FOREIGN PATENT DOCUMENTS

| | | | | |
|---|---|---|---|---|
| EP | | 0574951 | 12/1993 | |
| EP | | 2189976 A1 * | 5/2010 | ............. G10L 15/06 |

(Continued)

OTHER PUBLICATIONS

Hinton et al "Deep Neural Networks for Acoustic Modeling in Speech Recognition," IEEE Signal Processing Magazine, Nov. 2012, pp. 82-97.*

(Continued)

*Primary Examiner* — Daniel C Washburn
*Assistant Examiner* — Oluwadamilola M Ogunbiyi
(74) *Attorney, Agent, or Firm* — Fish & Richardson P.C.

(57) ABSTRACT

Methods, systems, and apparatus, including computer programs encoded on a computer storage medium, for speech recognition using neural networks. A feature vector that models audio characteristics of a portion of an utterance is received. Data indicative of latent variables of multivariate factor analysis is received. The feature vector and the data indicative of the latent variables is provided as input to a neural network. A candidate transcription for the utterance is determined based on at least an output of the neural network.

20 Claims, 5 Drawing Sheets

(56) References Cited

U.S. PATENT DOCUMENTS

| | | | |
|---|---|---|---|
| 2008/0050357 A1* | 2/2008 | Gustafsson | C07K 16/1027 424/130.1 |
| 2010/0155243 A1* | 6/2010 | Schneider et al. | 204/452 |
| 2012/0119080 A1* | 5/2012 | Hazebroek | G01N 33/4833 250/282 |
| 2012/0259632 A1* | 10/2012 | Willett | 704/234 |
| 2013/0225128 A1 | 8/2013 | Gomar | |
| 2016/0042513 A1* | 2/2016 | Yudovsky | G06F 19/321 382/128 |

FOREIGN PATENT DOCUMENTS

| | | |
|---|---|---|
| WO | 2007/131530 | 11/2007 |
| WO | WO 2014029099 A1 * | 2/2014 |

OTHER PUBLICATIONS

Garcia-Romero et al, "Analysis of I-vector Length Normalization in Speaker Recognition Systems," Twelfth Annual Conference of the International Speech Communication Association, 2011. Web availability: <http://www.isr.umd.edu/Labs/SCL/publications/conference/dgromero_is11_Inorm_final.pdf>.*

Saul et al, "Maximum Likelihood and Minimum Classification Error Factor Analysis for Automatic Speech Recognition," IEEE Transactions on Speech and Audio Processing, vol. 8, No. 2, Mar. 2, 2000. (Year: 2000).*

Abad, Alberto, "The L2F Language Recognition System for NIST LRE 2011", The 2011 NIST Language Recognition evaluation (LRE11) Workshop, Atlanta, US, Dec. 2011, 7 pages.

Bahari, Mohammad Hasan et al., "Age Estimation from Telephone Speech using i-vectors", Interspeech 2012, 13th Annual Conference of the International Speech Communication Association, 4 pages.

Bahar, Mohammad Hasan et al., "Accent Recognition Using I-Vector, Gaussian Mean Supervector and Gaussian Posterior Probability Supervector for Spontaneous Telephone Speech," 2013 IEEE International Conference on Acoustics, Speech, and Signal Processing (ICASSP), 5 pages.

Dehak, Najim et al., "Language Recognition via Ivectors and Dimensionality Reduction", Interspeech 2011, 12th Annual Conference of the International Speech Communication Association, 4 pages.

Dehak, Najim et al., "Front-End Factor Analysis for Speaker Verification", IEEE Transactions on Audio, Speech and Language Processing, vol. 19, issue 4, May 2011, 12 pages.

D'Haro, Luis Ferdinand et al., "Phonotactic Language Recognition using i-vectors and Phoneme Posteriogram Counts", Interspeech 2012, 13th Annual Conference of the International Speech Communication Association , 4 pages.

Factor Analysis from Wikipedia, the free encyclopedia, downloaded from the internet on Jul. 15, 2013, http://en.wikipedia.org/w/index.php?title=Factor_analysis&oldid=559725962, 14 pages.

Hinton, Geoffrey et al., "Deep Neural Networks for Acoustic Modeling in Speech Recognition", IEEE Signal Processing Magazine, Nov. 2012, 16 pages.

I-Vectors from ALIZE wiki, downloaded from the internet on Jul. 15, 2013, http://mistral.univ-avignon.fr/mediawiki/index.php/I-Vectors, 2 pages.

Larcher, Anthony et al., "I-Vectors in the Context of Phonetically-Constrained Short Utterances for Speaker Verification", 2012 IEEE International Conference on Acoustics, Speech and Signal Processing (ICASSP), 4 pages.

Latent Variable from Wikipedia, the free encyclopedia, downloaded from the internet on Jul. 15, 2013, http://en.wikipedia.org/w/index.php?title=Latent_variable&oldid=555584475, 3 pages.

Martinez, David et al., "IVector-Based Prosodic System for Language Identification", 2012 IEEE International Conference on Acoustics, Speech and Signal Processing (ICASSP), 4 pages.

Martinez, David et al., "Language Recognition in iVectors Space", Interspeech 2011, 12th Annual Conference of the International Speech Communication Association , 4 pages.

Singer, Elliot et al., "The MITLL NIST LRE 2011 Language Recognition System", Odyssey 2012, The Speaker and Language Recognition Workshop, Jun. 25-28, 2012, Singapore, 7 pages.

Speech Recognition from Wikipedia, the free encyclopedia, downloaded from the internet on Jul. 15, 2013, http://en.wikipedia.org/w/index.php?title=Speech_recognition&oldid=555081415, 13 pages.

International Preliminary Report on Patentability in International Application No. PCT/US2014/044528, dated Feb. 11, 2016, 7 pages.

Coccaro and Jurafsky, "Towards Better Integration of Semantic Predictors in Statistical Language Modeling," Proceedings for ICSLP-98, vol. 6, pp. 2403-2406.

Coccaro, "Latent Semantic Analysis as a Tool to Improve Automatic Speech Recognition Performance," Doctoral Dissertation, University of Colorado at Boulder, 2005, 102 pages.

Mikolov and Zweig, "Context Dependent Recurrent Neural Network Language Model," Spoken Language Technologies, Jul. 2012, pp. 234-239.

Zhang and Rudnicky, "Improve Latent Semantic Analysis Based Language Model by Integrating Multiple Level Knowledge," Conference Proceeding, Carnegie Mellon University, 2002, 5 pages.

Generative model from Wikipedia, the free encyclopedia, Apr. 30, 2015, downloaded from the Internet on Aug. 4, 2015, https://en.wikipedia.org/wiki/Generative_model, 2 pages.

Mohamed et al., "Deep belief networks using discriminative features for phone recognition," in Proc. ICASSP, May 2011, pp. 5060-5063.

Restricted Boltzmann machine from Wikipedia, the free encyclopedia, Mar. 5, 2015, downloaded from the Internet on Aug. 4, 2015, https://en.wikipedia.org/wiki/Restricted_Boltzmann_machine, 5 pages.

International Search Report and Written Opinion in International Application No. PCT/US2014/044528, dated Oct. 2, 2014, 10 pages.

* cited by examiner

SPEECH RECOGNITION USING NEURAL NETWORKS

FIELD

This specification describes technologies related to speech recognition.

BACKGROUND

Automatic speech recognition is an important technology that is used in mobile devices and other devices. In general, automatic speech recognition attempts to provide accurate transcriptions of what a person has said.

SUMMARY

Neural networks can be used in speech recognition, for example, as acoustic models that can indicate likelihoods that audio data corresponds to certain units of speech. Input to a neural network used for speech recognition can include information about the acoustic features of a portion of an utterance, as well as other information, such as information indicating characteristics of the speaker's voice, characteristics of background audio conditions, and/or characteristics of the utterance as a whole. In some implementations, latent variables of a multivariate factor analysis model and acoustic features are both input to a neural network to recognize speech.

An audio signal may include information about many different factors. For example, in addition to indicating which words were spoken, an audio signal may include information about other factors such as background noise, room characteristics (e.g., reverberations), and recording channel properties, as well as the speaker's speaking style, gender, age, and accent. The information about these other factors can distract from the content of the speech (e.g., the identity of the words spoken) making speech recognition difficult. To improve speech recognition, a neural network can be provided a measure of audio characteristics that are independent of what words were spoken. Using an explicit measure of audio characteristics that are not indicative of the words spoken, the neural network may be able to isolate or filter out the distracting audio characteristics and better identify the words or components of words that were spoken. Latent variables of multivariate factor analysis or other information may be provided to a neural network when training the neural network and when using the trained neural network to recognize speech.

In a general aspect, a method performed by data processing apparatus includes: receiving a feature vector that models audio characteristics of a portion of an utterance; receiving data indicative of latent variables of multivariate factor analysis; providing, as input to a neural network, the feature vector and the data indicative of the latent variables; and determining a candidate transcription for the utterance based on at least an output of the neural network.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Implementations may include one or more of the following features. For instance, receiving data indicative of latent variables of multivariate factor analysis includes receiving data indicative of latent variables of multivariate factor analysis of the audio signal that includes the utterance, and providing, as input to a neural network, the feature vector and the data indicative of the latent variables includes providing, as input to a neural network, the feature vector and the data indicative of the latent variables of multivariate factor analysis of the audio signal that includes the utterance. The utterance is uttered by a speaker, and receiving data indicative of latent variables of multivariate factor analysis includes receiving data indicative of latent variables of multivariate factor analysis of an audio signal that (i) does not include the utterance and (ii) includes other utterances uttered by the speaker. Receiving data indicative of latent variables of multivariate factor analysis includes receiving an i-vector indicating time-independent audio characteristics, and providing, as input to a neural network, the feature vector and the data indicative of the latent variables includes providing, as input to a neural network, the feature vector and the i-vector.

Implementations may include one or more of the following features. For instance, the utterance is uttered by a speaker, and the data indicative of latent variables of multivariate factor analysis is first data indicative of latent variables of multivariate factor analysis. The method includes determining that an amount of audio data received satisfies a threshold; in response to determining that the amount of audio data received satisfies the threshold, obtaining second data indicative of latent variables of multivariate factor analysis, the second data being different from the first data; providing, as input to the neural network, a second feature vector that models audio characteristics of a portion of a second utterance and the second data; and determining a candidate transcription for the second utterance based on at least a second output of the neural network. Providing, as input to a neural network, the feature vector and the data indicative of the latent variables includes providing the feature vector and the data indicative of the latent variables to a neural network trained using audio data and data indicative of latent variables of multivariate factor analysis corresponding to the audio data. Determining the candidate transcription for the utterance based on at least an output of the neural network includes: receiving, as an output of the neural network, data indicating a likelihood that the feature vector corresponds to a particular phonetic unit; and determining the candidate transcription based on the data indicating the likelihood that the feature vector corresponds to the particular phonetic unit.

Implementations may include one or more of the following features. For instance, the method can include recognizing a first portion of a speech sequence by providing a feature vector to an acoustic model that does not receive data indicative of latent variables of multivariate factor analysis as input, and after recognizing the first portion of the speech sequence, determining that at least a minimum amount of audio of the speech sequence has been received. The utterance may occur in the speech sequence after the first portion, receiving data indicative of latent variables of multivariate factor analysis includes receiving data indicative of latent variables of multivariate factor analysis of received audio including the first portion of the speech sequence. Providing, as input to a neural network, the feature vector and the data indicative of the latent variables includes providing the feature vector and the data indicative of the latent variables as input to a neural network that is different from the acoustic model. The method includes: receiving a second feature vector that models audio characteristics of a second portion of the utterance; providing, as input to a neural network, the second feature vector and the data indicative of the latent variables; and receiving a second output from the neural network. Determining the candidate transcription for the utterance is based on at least the output of the neural network and the second output of the neural network.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
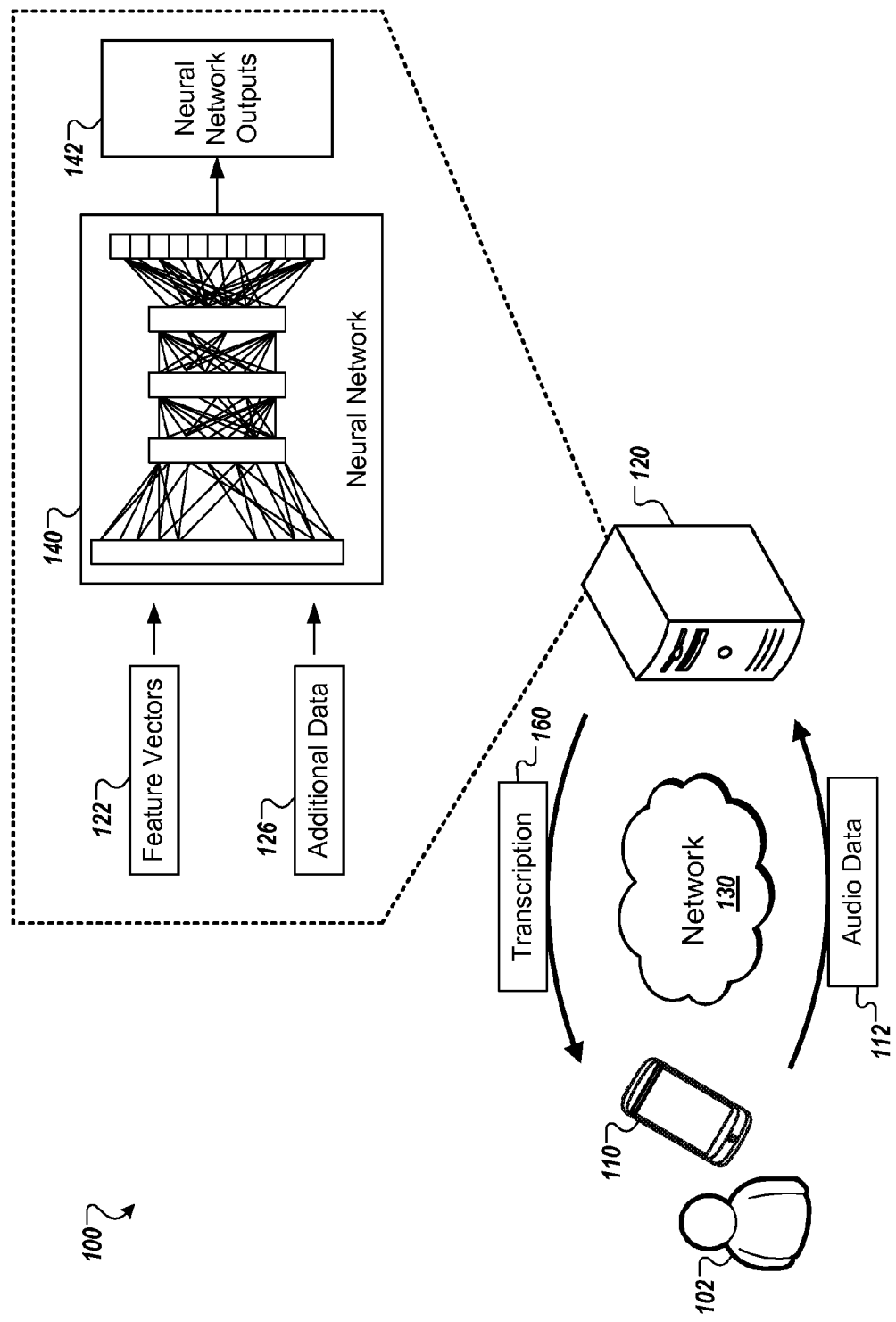
FIG. 1 is a block diagram that illustrates an example of a system 100 for speech recognition using neural networks.

FIG. 1 is a block diagram that illustrates an example of a system 100 for speech recognition using neural networks. The system 100 includes a client device 110, a computing system 120, and a network 130. In the example, the computing system 120 provides information about an utterance and additional information to a neural network 140. The computing system 120 uses output from the neural network 140 to identify a transcription for the utterance.

In some implementations, the computing system 120 receives a feature vector that models audio characteristics of a portion of an utterance. The computing system may receive data indicative of latent variables of multivariate factor analysis. The computing system 120 may provide, as input to a neural network, the feature vector and the data indicative of the latent variables. The computing system 120 may determine a candidate transcription for the utterance based on at least an output of the neural network.

In the system 100, the client device 110 can be, for example, a desktop computer, laptop computer, a tablet computer, a wearable computer, a cellular phone, a smart phone, a music player, an e-book reader, a navigation system, or any other appropriate computing device. The functions performed by the computing system 120 can be performed by individual computer systems or can be distributed across multiple computer systems. The network 130 can be wired or wireless or a combination of both and can include the Internet.

In the illustrated example, a user 102 of the client device 110 speaks, and the client device 110 records audio that includes the speech. The client device 110 transmits the recorded audio signal 112 to the computing system 120 over the network 130.

The computing system 120 receives the audio signal 112 and obtains information about acoustic features of the audio signal 112. For example, the computing system 120 may generate a set of feature vectors 122, where each feature vector 122 indicates audio characteristics during a different portion or window of the audio signal 112. Each feature vector 122 may indicate acoustic properties of, for example, a 10 millisecond (ms), 25 ms, or 50 ms portion of the audio signal 112.

The computing system 120 also obtains additional information 126. The additional information 126 may be indicative of audio characteristics that are independent of the words spoken by the user 102. For example, the additional information 126 may indicate audio features that correspond to one or more of background noise, recording channel properties, the speaker's speaking style, the speaker's gender, the speaker's age, and/or the speaker's accent. While the feature vectors 122 may be indicative of audio characteristics of specific portions of the particular words spoken, the additional information 126 may be indicative of general characteristics of the audio signal 112.

As discussed further below, the additional information 126 can include latent variables of multivariate factor analysis (MFA) of the audio signal 112 or of one or more other audio signals. The latent variables may be accessed from data storage, received from another system, or calculated by the computing system 120. To obtain the additional information 126, the feature vectors 112, or other feature vectors derived from the audio signal 112, may be analyzed by a factor analysis model. The factor analysis model may create a probabilistic partition of an acoustic space using a Gaussian Mixture Model, and then average the feature vectors associated with each partition. The averaging can be a soft averaging weighted by the probability that each feature vector belongs to the partition. The result of processing with the factor analysis model can be an i-vector, as discussed further below.

A variety of different types of additional information 126 may be used. In some implementations, the additional information 126 is determined from the particular audio signal 112 that is being recognized. The additional information 126 can include feature vectors that are produced with different from the processing used to generate the feature vectors 122. In some implementations, the additional information 126 is determined from audio other than the particular audio signal 112 that is being recognized. For example, the additional information 126 may indicate characteristics of other speech of the user 102, typical background noise at the location of the user 102, or speech of other users (e.g., users with the same age and gender). In some implementations, some or all of the additional information 126 indicates characteristics of the speaker or the recording environment without indicating audio characteristics. As an example, the additional information 126 may be data that indicates an age or gender of the speaker. As another example, the additional information 126 may indicate that the user is located in a restaurant, train station, or other type of location.

In the illustrated example, the computing system 120 inputs the feature vectors 122 and the additional data 126 to the neural network 140. The neural network 140 has been trained to act as an acoustic model. For example, the neural network 140 indicates likelihoods that feature vectors correspond to different speech units when the feature vectors and certain types of additional information are provided.

The neural network 140 produces neural network outputs 142, which the computing system 120 uses to identify a transcription 160 for the audio signal 112. For example, the computing system 120 may provide the neural network outputs 142 to, for example, weighted finite state transducers that approximate a hidden Markov model (HMM), which may include information about a lexicon indicating the phonetic units of words, a grammar, and a language model that indicates likely sequences of words. The output of the HMM can be a word lattice from which the transcription 160 may be derived. The computing system 120 then provides the transcription 160 to the client device 110 over the network 130.

Figure 2:
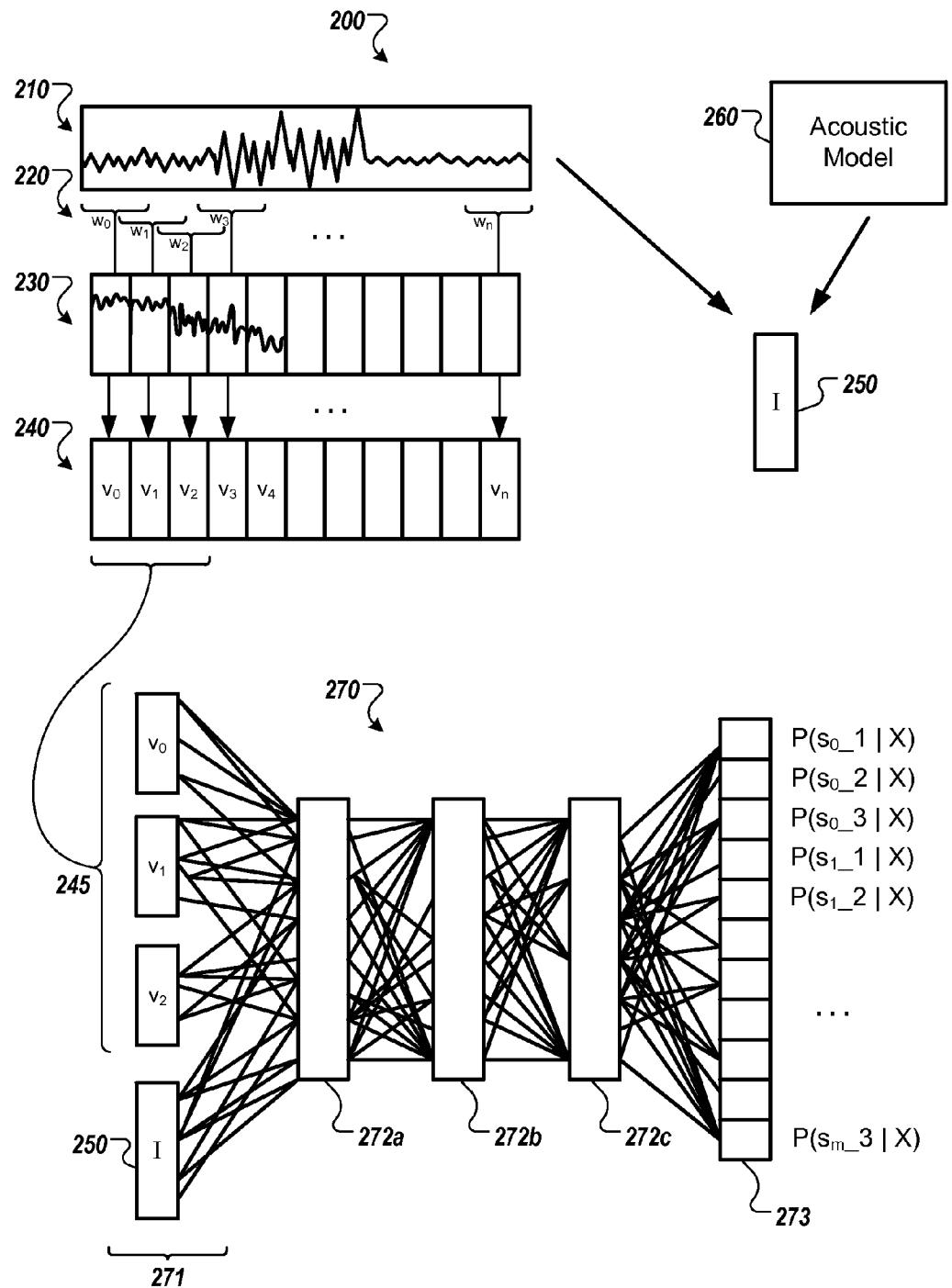
FIG. 2 is a diagram 200 that illustrates an example of processing for speech recognition using neural networks.

FIG. 2 is a diagram 200 that illustrates an example of processing for speech recognition using neural networks. The operations discussed are described as being performed by the computing system 120, but may be performed by other systems, including combinations of multiple computing systems.

The computing system 120 receives data about an audio signal 210 that includes speech to be recognized. The computing system 120 or another system then performs feature extraction on the audio signal 210. For example, the computing system 120 analyzes different segments or analysis windows 220 of the audio signal 210. The windows 220 are labeled $w_0, \ldots w_n$, and as illustrated, the windows 220 can overlap. For example, each window 220 may include 25 ms of the audio signal 210, and a new window 220 may begin every 10 ms. For example, the window 220 labeled $w_0$ may represent the portion of audio signal 210 from a start time of 0 ms to an end time of 25 ms, and the next window 220, labeled $w_1$, may represent the portion of audio signal 120 from a start time of 10 ms to an end time of 35 ms. In this manner, each window 220 includes 15 ms of the audio signal 210 that is included in the previous window 220.

The computing system 120 performs a Fast Fourier Transform (FFT) on the audio in each window 220. The results of the FFT are shown as time-frequency representations 230 of the audio in each window 220. From the FFT data for a window 220, the computing system 120 extracts features that are represented as an acoustic feature vector 240 for the window 220. The acoustic features may be determined by binning according to filterbank energy coefficients, using a mel-frequency ceptral component (MFCC) transform, using a perceptual linear prediction (PLP) transform, or using other techniques. In some implementations, the logarithm of the energy in each of various bands of the FFT may be used to determine acoustic features.

The acoustic feature vectors 240, labeled $v_1 \ldots v_n$, include values corresponding to each of multiple dimensions. As an example, each acoustic feature vector 240 may include a value for a PLP feature, a value for a first order temporal difference, and a value for a second order temporal difference, for each of 13 dimensions, for a total of 39 dimensions per acoustic feature vector 240. Each acoustic feature vector 240 represents characteristics of the portion of the audio signal 210 within its corresponding window 220.

The computing system 120 also obtains an i-vector 250. For example, the computing system 120 may process the audio signal 210 with an acoustic model 260 to obtain the i-vector 250. In the example, the i-vector 250 indicates latent variables of multivariate factor analysis. The i-vector 250 may be normalized, for example, to have a zero mean unit variance. In addition, or as an alternative, the i-vector 250 may be projected, for example, using principal component analysis (PCA) or linear discriminant analysis (LDA). Techniques for obtaining an i-vector are described further below with respect to FIG. 3.

The computing system 120 uses a neural network 270 that can serve as an acoustic model and indicate likelihoods that acoustic feature vectors 240 represent different phonetic units. The neural network 270 includes an input layer 271, a number of hidden layers $272a$-$272c$, and an output layer 273. The neural network 270 receives an i-vector as input as well as receiving acoustic feature vectors. Many typical neural networks used for speech recognition include input connections for receiving only acoustic feature information. By contrast, the neural network 270 receives acoustic feature information augmented with additional information such as an i-vector. For example, the first hidden layer $272a$ has connections from the i-vector input portion of the input layer 271, where such connections are not present in typical neural networks used for speech recognition.

The neural network 270 has been trained to estimate likelihoods that a combination of feature vectors and an i-vector represent particular phonetic units. For example, during training, input to the neural network 270 may be a combination of acoustic feature vectors and an i-vector corresponding to the utterance from which the acoustic feature vectors were derived. Many inputs combining acoustic feature vectors and an i-vector can be used to train the neural network 270, and the various training data sets can include acoustic feature vectors and i-vectors derived from utterances from multiple speakers.

To recognize speech in the audio signal 210 using the neural network 270, the computing system 120 inputs the i-vector 250 at the input layer 271 of the neural network 270 with different sets of acoustic feature vectors 240. In the example, the neural network 270 receives a set 245 of acoustic feature vectors 240 that includes (i) an acoustic feature vector 240 for a window 220 of speech to be recognized and (ii) one or more acoustic feature vectors 240 that serve as context. The set 245 can include acoustic feature vectors 240 corresponding to a predefined number of consecutive windows 220. In the example, the set 245 includes the acoustic feature vector 240 labeled $v_1$, which indicates features of audio in the window 220 labeled $w_1$. As context for this feature vector, the set 245 also includes the acoustic feature vectors 240 labeled $v_0$ and $v_2$, which respectively indicate features of audio in the windows 220 immediately preceding and immediately following the window 220 labeled $w_1$. The set 245 of acoustic feature vectors 240 and the i-vector 250 are concatenated or stacked together to form the complete input to the neural network 270.

At the output layer 273, the neural network 270 indicates likelihoods that the speech in the window 220 under analysis (e.g., the window $w_1$ corresponding to acoustic feature vector $v_1$) corresponds to specific phonetic units. In some implementations, the phonetic units used are phones or components of phones. In the example, the potential phones are referred to as $s_0 \ldots s_m$. The phones may be any of the various phones in speech, such as an "ah" phone, an "ae" phone, a "zh" phone, and so on. The phones $s_0 \ldots s_m$ may include all of the possible phones that may occur in the audio signal 210, or fewer than all of the phones that may occur. Each phone can be divided into three acoustic states.

The output layer 273 provides predictions or probabilities of acoustic states given the data at the input layer 271. The output layer 273 can provide a value, for each state of each phone, that indicates the probability that the acoustic feature vector $v_1$ represents the particular state of the particular phone. For example, for a first phone, $s_0$, the output layer 273 can provide a first value that indicates a probability $P(s_0\_1|X)$, which indicates a probability that the window $w_1$ includes the first acoustic state of the $s_0$ phone, given the set of input, X, provided at the input layer 271. For a first phone, $s_1$, the output layer 273 can provide a second value indicating a probability $P(s_0\_2|X)$, indicating a probability that the window $w_1$ includes the second acoustic state of the $s_0$ phone, given the set of input, X, provided at the input layer 271. Similar outputs can be provided for all states of all of the phones $s_0 \ldots s_m$.

The computing system 120 provides different sets of acoustic feature vectors 240 to the neural network 270 to receive predictions or probabilities of the acoustic states in the different windows 220. The computing system 120 may apply a sliding window to the acoustic feature vectors 240 to select different sets. In the example, the sliding window has a size of three acoustic feature vectors 240. For example, the computing system 120 may provide acoustic feature vectors 240 $v_1$, $v_2$, and $v_3$ and the i-vector 250 as input to the neural network 270 to obtain output values regarding the speech in window $w_2$. The computing system 120 may provide acoustic feature vectors 240 $v_2$, $v_3$, and $v_4$ and the i-vector 250 as input to the neural network 270 to obtain output values regarding the speech in the window $w_3$. In this manner, the computing system 120 may obtain outputs corresponding to each position of the sliding window across the acoustic feature vectors 240.

As the sliding window is moved across the acoustic feature vectors 240 and different sets of acoustic feature vectors 240 are input to the neural network 270, the same i-vector 250 may be included in the input. The i-vector 250 indicates constant or overall properties of the audio signal 210 as a whole. As a result, the information in the i-vector 250 is independent of the particular acoustic states that may occur at specific windows 220.

The output of the neural network 270 is provided to a set of weighted finite state transducers that represents a language model composed with context information, a lexicon, and a grammar. The set of weighted finite state transducers can approximate an HMM. The weighted finite state transducers output a word lattice that the computing system 120 can use to determine a transcription for the audio signal.

As indicated above, each output from the neural network 270 can include a posterior probability P(state|X), representing a likelihood of a particular acoustic state given the current set of input data, X. In some implementations, the computing system 120 divides the posterior, P(state|X) by the prior, P(state), to generate a scaled posterior probability for each output. The resulting scaled posterior probabilities are then input to the weighted finite state transducers for further processing.

In the example of FIG. 2, the sliding window of acoustic feature vectors 240 includes three acoustic feature vectors 240. More or fewer acoustic feature vectors 240 may be provided in each set of input to the neural network 270. For example, 2, 3, 5, 10, or another number of feature vectors for windows 220 before and after a central vector may be input simultaneously to the neural network 270.

In some implementations, the i-vector 250 is a current utterance i-vector derived from the current utterance (e.g., the particular audio signal 210) being recognized. In some implementations, the i-vector 250 is derived from audio signals other than the audio signal 210 containing the utterances being recognized. For example, the i-vector 250 may be derived from a prior utterance of the same speaker whose utterances are included in the audio signal 210.

In some implementations, the i-vector 250 may be a speaker i-vector that is pre-computed for a particular speaker using multiple utterances of the speaker (e.g., utterances from multiple different recording sessions, such as recordings on different days). To generate a speaker i-vector, an i-vector can be determined for each utterance in a set of multiple utterances of the speaker. The i-vectors can be averaged together to obtain generate the speaker i-vector. In some implementations, where a speaker i-vector is used rather than an utterance i-vector derived from the utterance being recognized, post processing may discriminative training, such as LDA, to identify attributes that are indicative of speaker characteristics. For example, various techniques can be used to isolate speaker characteristics, independent of noise, room characteristics, and other non-speaker-dependent characteristics.

Unlike an i-vector computed using the actual audio signal 210 being recognized, i-vectors derived from prior utterances may not reflect the particular background noise characteristics of the audio signal 210. These i-vectors will indicate characteristics of the speaker's voice and speaking style and are thus useful in recognition. In addition, the noise in prior utterances may be similar to the noise in the current utterance. The speaker i-vector may be calculated from a set recent utterances, such as a predetermined number of most recent utterances or audio acquired within a threshold time period, which may approximate the noise conditions of the current utterance if the recent utterances were recorded in a similar setting.

Recognition latency may be reduced by using i-vectors that are computed prior to receiving some or all of the audio signal 210. For example, the computing system 120 may use a pre-computed i-vector derived from other utterances to begin recognizing initial portions of the audio signal 210, without waiting for the entire audio signal 210 to be received. Thus the recognition techniques described above may be used in a continuous speech recognition or "streaming" scenario in which recognition proceeds while audio streams in.

In some implementations, the computing system 120 may identify the speaker and select an i-vector based on the speaker's identity. An i-vector may be calculated for each of multiple users, and the i-vectors may be stored for later use in recognizing speech of the corresponding users. The computing system 120 may receive a device identifier for a device, such as a mobile phone, that the speaker is using to record speech. In addition, or as an alternative, the computing system 120 may receive a user identifier that identifies the user, such as a name or user account login. The computing system 120 may identify the speaker as a user that owns the device or a user is logged into a user account on the device. In some implementations, the computing system 120 may identify the speaker before recognition begins, or before audio is received during the current session. The computing system 120 may then look up the i-vector that corresponds to the identified user and use that i-vector to recognize received speech.

In some implementations, a successive approximation technique may be used to approximate and re-estimate the i-vector 250 while audio is received. The i-vector 250 may be re-estimated at a predetermined interval, for example, each time a threshold amount of new audio has been received. For example, a first i-vector may be estimated using the initial three seconds of audio received. Then, after another three seconds of audio has been received, a second i-vector may be estimated using the six seconds of audio received so far. After another three seconds, a third i-vector may be estimated using all nine seconds of audio received, and so on. The re-estimation period may occur at longer intervals, such as 10 seconds or 30 seconds, to reduce the amount of computation required. In some implementations, i-vectors are re-estimated at pauses in speech (e.g., as detected by a speech energy or voice activity detection algorithm), rather than at predetermined intervals.

An i-vector derived from a small segment of an utterance may introduce some inaccuracy compared to an i-vector for the entire utterance, but as more audio is received, the estimated i-vectors approach the accuracy of an i-vector derived from the whole utterance. In addition, audio from recent utterances (e.g., audio from a predetermined number of most recent utterances or audio acquired within a threshold period of the current time) may be used with received audio to estimate the i-vectors, which may further reduce any inaccuracy present in the estimates.

In some implementations, the computing system 120 transitions from using a first i-vector to a second i-vector during recognition of an utterance. For example, the computing system 120 may begin by using a first i-vector derived from a previous utterance. After a threshold amount of audio has been received (e.g., 3, 5, 10, or 30 seconds), the computing system 120 generates a second i-vector based on the audio received in the current session and uses the second i-vector to process subsequently received audio.

In some implementations, to reduce latency, the computing system 120 may recognize the initial portion of an utterance with an acoustic model that does not receive an i-vector as input. For example, a neural network trained as an acoustic model using only acoustic feature vectors as inputs or another acoustic model may be used. After receiving a threshold amount of audio that permits reliable estimation of an i-vector, an i-vector is been calculated based on the received audio. The computing system 120 may then switch from recognizing received audio using the neural network that does not receive i-vectors to recognizing speech using the neural network 270 that has been augmented to receive i-vectors as input.

Figure 3:
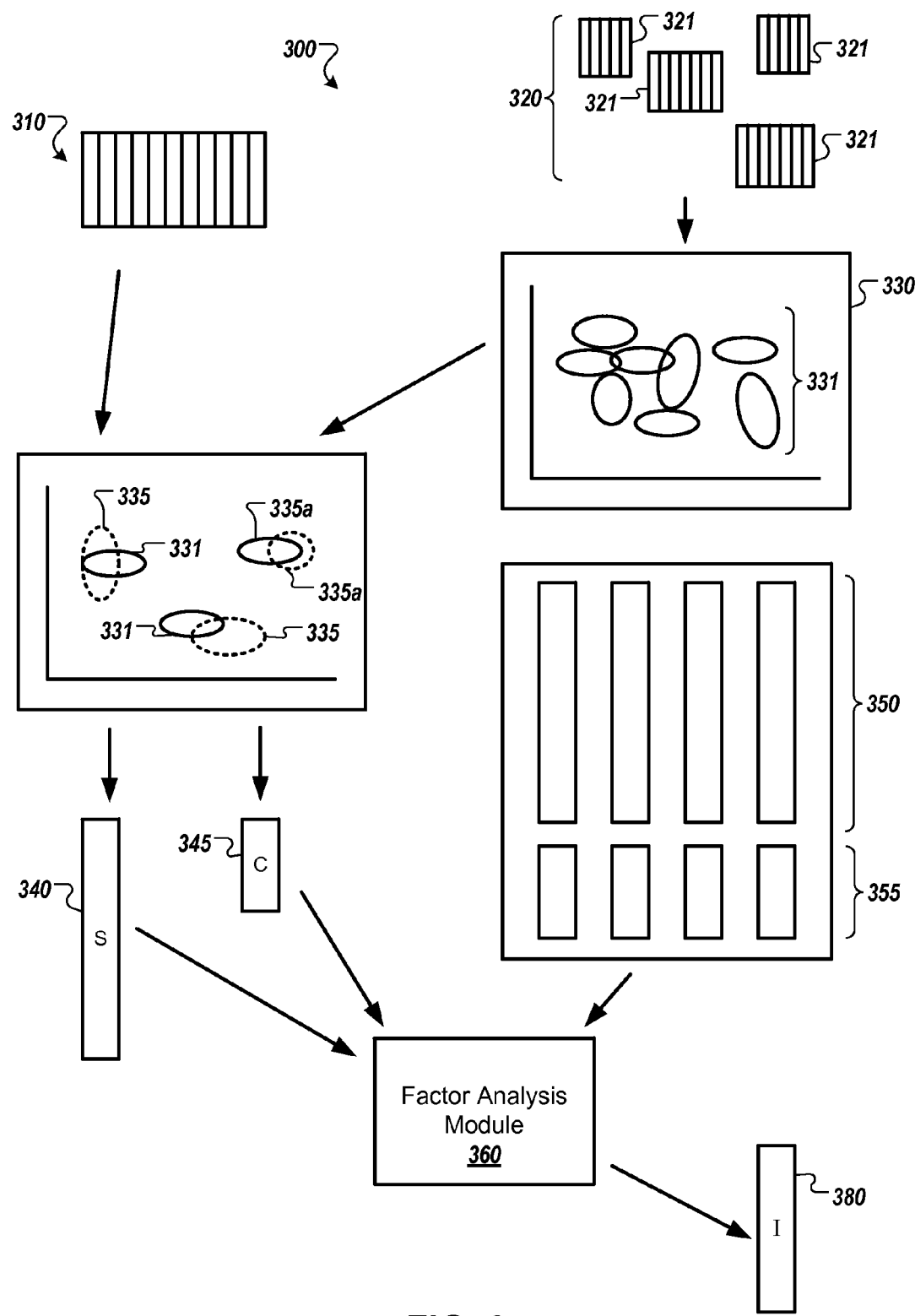
FIG. 3 is a diagram 300 that illustrates an example of processing to generate latent variables of factor analysis.

FIG. 3 is a diagram 300 that illustrates an example of processing to generate latent variables of factor analysis. The example of FIG. 3 shows techniques for determining an i-vector, which includes these latent variables of factor analysis. I-vectors are time-independent components that represent overall characteristics of an audio signal rather than characteristics at a specific segment of time within an utterance. I-vectors can summarize a variety of characteristics of audio that are independent of the phonetic units spoken, for example, information indicative of the identity of the speaker, the language spoken, recording channel properties, and noise characteristics.

The example of FIG. 3 illustrates processing to calculate an i-vector 380 for a sample utterance 310. The computing system 120 accesses training data 320 that includes a number of utterances 321. The training data 320 may include utterances 321 including speech from different speakers, utterances 321 having different background noise conditions, and utterances 321 having other differences. Each of the utterances 321 is represented as a set of acoustic feature vectors. Each of the acoustic feature vectors can be, for example, a 39-dimensional vector determined in the same manner that the acoustic feature vectors 240 are determined in the example of FIG. 2.

The computing system 120 uses the utterances 321 to train a Gaussian mixture model (GMM) 330. For example, the GMM 330 may include 1000 39-dimensional Gaussians 331. The GMM 330 is trained using the acoustic feature vectors of the utterances 321 regardless of the phones or acoustic states that the acoustic feature vectors represent. As a result, acoustic feature vectors corresponding to different phones and acoustic states are used to train the GMM 330. For example, all of the acoustic feature vectors from all of the utterances 321 in the training data 320 can be used to train the GMM 330. In this respect, the GMM 330 is different from GMMs that are trained with only the acoustic feature vectors for a single phone or a single acoustic state.

When the sample utterance 310 is received, the computing system 120 determines acoustic feature vectors that describe the utterance 310. The computing system 120 classifies the acoustic feature vectors of the utterance 310 using the GMM 330. For example, the Gaussian 331 that corresponds to each acoustic feature vector of the sample utterance 310 may be identified. The computing system 120 then re-estimates the Gaussians 331 that are observed in the sample utterance 310, illustrated as re-estimated Gaussians 335 shown in dashed lines. As an example, a set of one or more acoustic feature vectors of the sample utterance 310 may be classified as matching a particular Gaussian 331a from the GMM 330. Based on this set of acoustic feature vectors, the computing system 120 calculates a re-estimated Gaussian 335a having a mean and/or variance different from the Gaussian 331a. Typically, only some of the Gaussians 331 in the GMM 330 are observed in the sample utterance 310 and re-estimated.

The computing system 120 then identifies differences between the Gaussians 331 and the corresponding re-estimated Gaussians 335. For example, the computing system 120 may generate difference vectors that each indicate changes in parameters between a Gaussian 331 and its corresponding re-estimated Gaussian 335. Since each of the Gaussians is 39-dimensional, each difference vector can have 39 values, where each value indicates a change in one of the 39 dimensions.

The computing system 120 concatenates or stacks the difference vectors to generate a supervector 340. Because only some of the Gaussians 331 were observed and re-estimated, a value of zero (e.g., indicating no change from the original Gaussian 331) is included in the supervector 340 for each the 39 dimensions of each Gaussian 331 that was not observed in the sample utterance 310. For a GMM 330 having 1000 Gaussians that are each 39-dimensional, the supervector 340 would include 39,000 elements. In many instances, Gaussians 331 and the corresponding re-estimated Gaussians 335 differ only in their mean values. The supervector 340 can represent the differences between the mean values of the Gaussians 331 and the mean values of the corresponding re-estimated Gaussians 335.

In addition to generating the supervector 340, the computing system 120 also generates a count vector 345 for the utterance 310. The values in the count vector 345 can represent $0^{th}$ order Baum-Welch statistics, referred to as counts or accumulated posteriors. The count vector 345 can indicate the relative importance of the Gaussians 331 in the GMM 330. The count vector 345 includes a value for each Gaussian 331 in the GMM 330. As a result, for a GMM 330 having 1000 Gaussians, the count vector 345 for the utterance 310 would include 1,000 elements. Each value in the vector 345 can be the sum of the posterior probabilities of the feature vectors of the utterance 310 with respect to a particular Gaussian 331. For example, for a first Gaussian 331a, the posterior probability of each feature vector in the utterance 310 is computed (e.g., the probability of occurrence of the feature vector as indicated by the first Gaussian 331a). The sum of the posterior probabilities for the feature vectors in the utterance 310 is used as the value for the first Gaussian 331a in the count vector 345. Posterior probabilities for the each feature vector in the utterance 310 can be calculated and summed for each of the other Gaussians 331 to complete the count vector 345.

In the same manner that the supervector 340 and count vector 345 was generated for the sample utterance 310, the computing system 120 generates a supervector 350 and a count vector 355 for each of the utterances 321 in the training data 320. The GMM 330, the supervectors 350, and the count vectors 355 may be generated and stored before receiving the sample utterance 310. Then, when the sample utterance 310 is received, the previously generated GMM 330, supervectors 350, and count vectors can be accessed from storage, which limits the amount of computation necessary to generate an i-vector for the sample utterance 310.

The computing system 120 uses the supervectors 350 to create a factor analysis module 360. The factor analysis module 360, like the GMM 330 and the supervectors 350, may be generated in advance of receiving the sample utterance 310. The factor analysis module 360 can perform multivariate factor analysis to project a supervector to a lower-dimensional vector that represents particular factors of interest. For example, the factor analysis module may project a supervector of 39,000 elements to a vector of only a few thousand elements or only a few hundred elements.

The factor analysis module 360, like the GMM 330, is trained using a collection of utterances, which may be the utterances in the same training data 320 used to generate the GMM 330. An adapted or re-estimated GMM may be determined for each of the i utterances $[U_1, U_2, \ldots, U_i]$ in the training data 320, in the same manner that the re-estimated Gaussians 335 are determined for the utterance 310. A supervector 350 $[S_1, S_2, \ldots, S_i]$ and count vector 355 $[C_1, C_2, \ldots, C_i]$ for each utterance $[U_1, U_2, \ldots, U_i]$ is also determined. Using the vector pairs $[S_i, C_i]$ for each utterance, the factor analysis module 360 is trained to learn the common range of movement of the adapted or re-estimated GMMs for the utterances $[U_1, U_2, \ldots, U_i]$ relative to the general GMM 330. Difference parameters between re-estimated GMMs and the GMM 330 are then constrained to move only over the identified common directions of movement in the space of the supervectors. Movement is limited to a manifold, and the variables that describe the position of the difference parameters over the manifold are denoted as i-vectors. As a result, the factor analysis module 360 learns a correspondence $[S_i, C_i]$-->i-vector$_i$, such that $S_i/C_i$=f(i-vector$_i$), where f( ) is a linear function f(x)=T*x and T is a matrix.

The computing system 120 inputs the supervector 340 and count vector 345 for the sample utterance 310 to the trained factor analysis module 360. The output of the factor analysis module 360 is the i-vector 380, which includes latent variables of multivariate factor analysis. The i-vector 380 represents time-independent characteristics of the sample utterance 310 rather than characteristics of a particular window or subset of windows within the sample utterance 310. In some implementations, the i-vector 380 may include, for example, approximately 300 elements.

Figure 4:
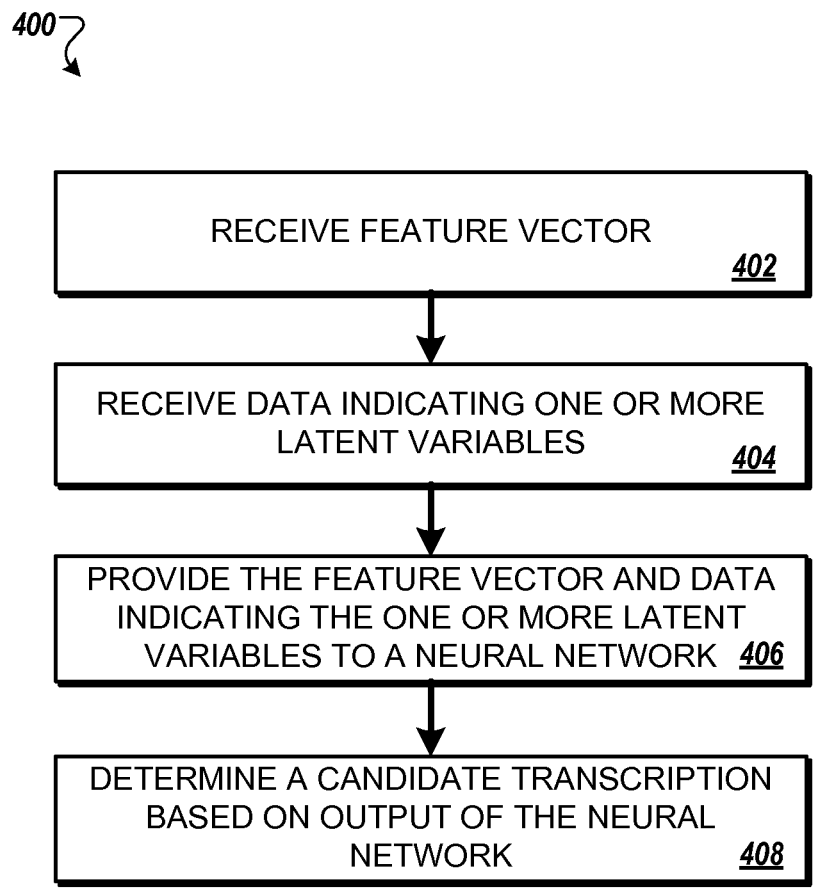
FIG. 4 is a flow diagram that illustrates an example of a process 400 for speech recognition using neural networks.

FIG. 4 is a flow diagram that illustrates an example of a process 400 for speech recognition using neural networks. The process 400 may be performed by data processing apparatus, such as the computing system 120 described above or another data processing apparatus.

A feature vector that models audio characteristics of a portion of an utterance is received (402). The feature vector can include values that indicate acoustic features for each of multiple dimensions. In some implementations, multiple feature vectors are received, where each feature vector indicates characteristics of a different segment of the utterance.

Data indicative of latent variables of multivariate factor analysis is received (404). The data can indicate audio characteristics that are independent of the particular words that were spoken in the utterance. The data can be indicative of latent variables of multivariate factor analysis of the audio signal that includes the utterance to be recognized. The data can be indicative of latent variables of multivariate factor analysis of an audio signal that (i) does not include the utterance and (ii) includes other utterances uttered by the speaker. For example, the data can be derived from speech in a prior recording session or on a different day. The data may be derived from multiple audio signals that include speech of the speaker, recorded on different days or during different recording sessions. In some implementations, an i-vector indicating time-independent audio characteristics may be received.

The feature vector and the data indicative of the latent variables is provided as input to a neural network (406). Multiple feature vectors may be provided as part of the input. The feature vector(s) and the data indicative of the latent variables are input together (e.g., simultaneously) as part of a single input data set. For example, the feature vector(s) and data indicative of latent variables may be combined into a single input vector which is input to the neural network. In this manner, a set of input data to the neural network includes a time-dependent component, e.g., the acoustic feature vector(s) representing characteristics of specific windows of the utterance, and a time-independent component, e.g., an i-vectors of latent variables that represents general characteristics of the utterance as a whole.

The neural network can be a neural network that has been trained using audio feature data and data indicative of latent variables of multivariate factor analysis corresponding to the audio feature data. The neural network may have been trained to provide estimates of probabilities of one or more phones or acoustic states based on input that includes a combination of one or more feature vectors and data indicative of latent variables of multivariate factor analysis.

A candidate transcription for the utterance based on at least an output of the neural network (408). The output of the neural network can indicate a likelihood that the feature vector, or the entire set of input to the neural network, corresponds to a particular phonetic unit, and the candidate transcription can be determined based on this likelihood.

In some implementations, the speaker is identified. For example, an identifier for the speaker or an identifier for a device that records the utterance is received, and the speaker is identified based on the received identifier. The data indicative of latent variables may be selected based on the identity of the speaker. For example, data indicating latent variables of multivariate factor analysis may be determined for a particular speaker and stored in association with the identifier, and then may be accessed and used to recognize utterances when the particular speaker is identified as the speaker.

In some implementations, it is determined that an amount of audio data received satisfies a threshold. For example, it may be determined that the current audio signal being recognized has at least a minimum duration. In response to determining that the threshold amount of audio has been received, second data indicative of latent variables of multivariate factor analysis may be received, where the second data being different from the first data. The neural network can be provided input that includes a second feature vector, which models audio characteristics of a portion of a second utterance, and the second data. A candidate transcription for the second utterance may be determined based on at least a second output of the neural network produced from the second feature vector and the second data.

The process 400 may include recognizing a first portion of a speech sequence by providing a feature vector to an acoustic model that does not receive data indicative of latent variables of multivariate factor analysis as input. After recognizing the first portion of the speech sequence, it may be determined that at least a minimum amount of audio of the speech sequence has been received. The utterance may occurs in the speech sequence after the first portion, and the received data may be indicative of latent variables of multivariate factor analysis of received audio including the first portion of the speech sequence. To provide input to the neural network, the input may be provided to neural network that is different from the acoustic model used to recognize the first portion of the speech sequence.

The process 400 may include receiving a second feature vector that models audio characteristics of a second portion of the utterance. The second feature vector and the data indicative of the latent variables are provided as input to the neural network. A second output of the neural network is received, and the candidate transcription for the utterance is determined based on at least the first output of the neural network and the second output of the neural network.

In some implementations, the same data indicative of variables of multivariate factor analysis is input to the neural network with different feature vectors or different sets of feature vectors representing portions of the utterance. For example, a second feature vector that models audio characteristics of a second portion of the utterance can be received. The second feature vector and the data indicative of the latent variables can be provided as input to the neural network. A second output from the neural network in response to the second set of input to the neural network. The candidate transcription for the utterance may be based on at least the first output of the neural network and the second output of the neural network.

Figure 5:
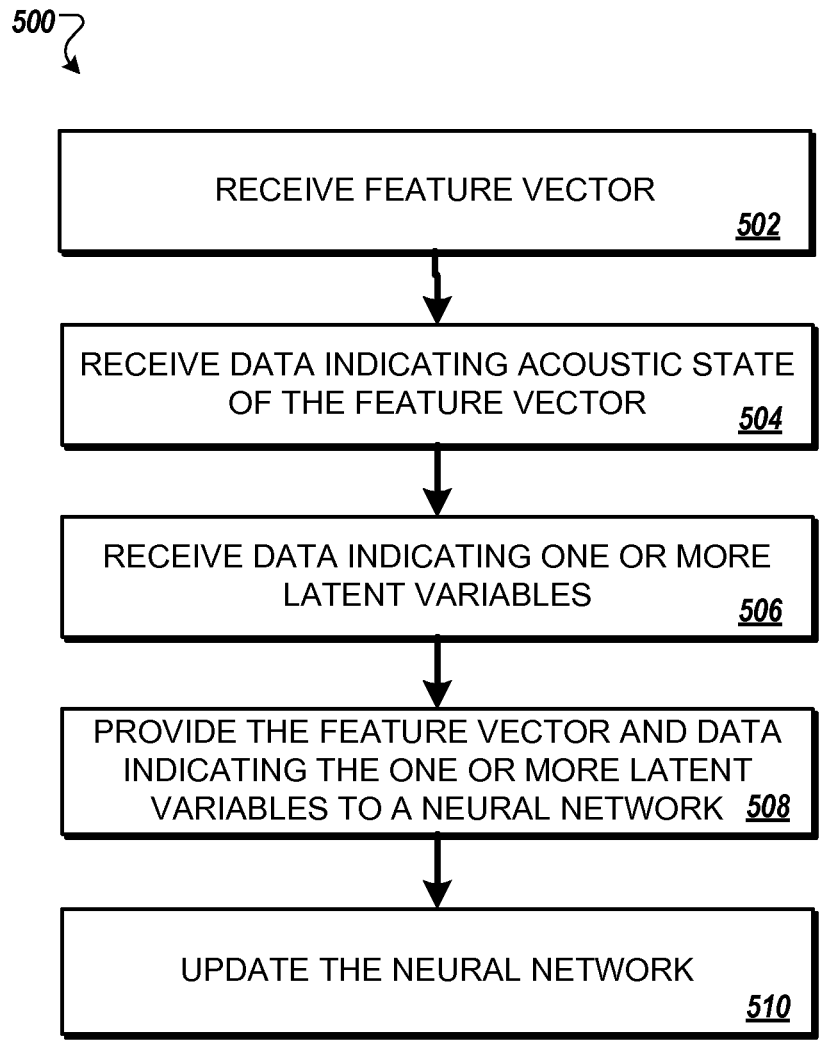
FIG. 5 is a flow diagram that illustrates an example of a process 500 for training a neural network.

FIG. 5 is a flow diagram that illustrates an example of a process 500 for training a neural network. The process 500 may be performed by data processing apparatus, such as the computing system 120 described above or another data processing apparatus.

A feature vector is received (502). The feature vector models audio characteristics of a portion of an utterance. The feature vector can include values that indicate acoustic features for each of multiple dimensions. In some implementations, multiple feature vectors are received. For example, a set of acoustic feature vectors that correspond to multiple consecutive windows of an utterance can be received. The set may include a central feature vector and contextual feature vectors that indicate the context that occurs before and/or after the central feature vector.

Data is received that indicates an acoustic state of the received feature vector (504). As an example, a label for the feature vector may indicate that the feature vector represents the "ah_1" acoustic state, or the "zh_3" acoustic state, or another acoustic state.

Data indicative of latent variables of multivariate factor analysis is received (506). The data can be an i-vector indicating latent variables of multivariate factor analysis of the utterance from which the received feature vector was extracted. The i-vector may be computed from feature vectors for the utterance, or the i-vector may be accessed from data storage or another system.

The feature vector and the data indicative of the latent variables is provided as input to a neural network (508). Multiple feature vectors may be provided as part of the input. For example, a set of input data to the neural network may include a central feature vector, contextual feature vectors, and an i-vector provided simultaneously at an input layer of the neural network.

The neural network is updated (510). Forward propagation through the neural network produces outputs at an output layer of the neural network. The outputs may be compared with data indicating correct or desired outputs that indicate that the received feature vector corresponds to the acoustic state indicated in a received label for the feature vector. A measure of error between the actual outputs of the neural network and the correct or desired outputs is determined. The error is then backpropagated through the neural network to update the weights within the neural network.

The process 500 may be repeated for feature vectors extracted from multiple different utterances in a set of training data. For each utterance or audio recording in the training data, an i-vector may be calculated based on characteristics of the utterance as a whole. Whenever a feature vector for a particular utterance is provided as input to the neural network, the i-vector calculated for the particular utterance may also be input to the neural network at the same time. During training, the frames selected for training can be selected randomly from a large set, so that frames from the same utterance are not processed consecutively.

A number of implementations have been described. Nevertheless, it will be understood that various modifications may be made without departing from the spirit and scope of the disclosure. For example, various forms of the flows shown above may be used, with steps re-ordered, added, or removed.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. A method performed by data processing apparatus, the method comprising:
    receiving a feature vector that models audio characteristics of a portion of an utterance;
    receiving data indicative of latent variables of multivariate factor analysis;
    providing the feature vector and the data indicative of the latent variables as input to an input layer of a neural network comprising the input layer, multiple hidden layers, and an output layer; and
    determining a candidate transcription for the utterance based on at least an output of the neural network that the neural network provides at the output layer in response to the feature vector and the data indicative of the latent variables being provided at the input layer.

2. The method of claim 1, wherein receiving data indicative of latent variables of multivariate factor analysis comprises receiving data indicative of latent variables of multivariate factor analysis of an audio signal that includes the utterance; and
    wherein providing, as input to a neural network, the feature vector and the data indicative of the latent variables comprises providing, as input to a neural network, the feature vector and the data indicative of the latent variables of multivariate factor analysis of the audio signal that includes the utterance.

3. The method of claim 1, wherein the utterance is uttered by a speaker; and
wherein receiving data indicative of latent variables of multivariate factor analysis comprises receiving data indicative of latent variables of multivariate factor analysis of an audio signal that (i) does not include the utterance and (ii) includes other utterances uttered by the speaker.

4. The method of claim 1, wherein receiving data indicative of latent variables of multivariate factor analysis comprises receiving an i-vector indicating time-independent audio characteristics; and
wherein providing, as input to a neural network, the feature vector and the data indicative of the latent variables comprises providing, as input to a neural network, the feature vector and the i-vector.

5. The method of claim 1, wherein the utterance is uttered by a speaker, and the data indicative of latent variables of multivariate factor analysis is first data indicative of latent variables of multivariate factor analysis;
further comprising:
determining that an amount of audio data received satisfies a threshold;
in response to determining that the amount of audio data received satisfies the threshold, obtaining second data indicative of latent variables of multivariate factor analysis, the second data being different from the first data;
providing, as input to the neural network, a second feature vector that models audio characteristics of a portion of a second utterance and the second data; and
determining a candidate transcription for the second utterance based on at least a second output of the neural network.

6. The method of claim 1, wherein providing, as input to a neural network, the feature vector and the data indicative of the latent variables comprises providing the feature vector and the data indicative of the latent variables to a neural network trained using audio data and data indicative of latent variables of multivariate factor analysis corresponding to the audio data;
wherein determining the candidate transcription for the utterance based on at least an output of the neural network comprises:
receiving, as an output of the neural network, data indicating a likelihood that the feature vector corresponds to a particular phonetic unit; and
determining the candidate transcription based on the data indicating the likelihood that the feature vector corresponds to the particular phonetic unit.

7. The method of claim 1, further comprising:
recognizing a first portion of a speech sequence by providing a feature vector to an acoustic model that does not receive data indicative of latent variables of multivariate factor analysis as input; and
after recognizing the first portion of the speech sequence, determining that at least a minimum amount of audio of the speech sequence has been received;
wherein:
the utterance occurs in the speech sequence after the first portion;
receiving data indicative of latent variables of multivariate factor analysis comprises receiving data indicative of latent variables of multivariate factor analysis of received audio including the first portion of the speech sequence; and
providing, as input to a neural network, the feature vector and the data indicative of the latent variables comprises providing the feature vector and the data indicative of the latent variables as input to a neural network that is different from the acoustic model.

8. The method of claim 1, further comprising:
receiving a second feature vector that models audio characteristics of a second portion of the utterance;
providing, as input to a neural network, the second feature vector and the data indicative of the latent variables; and
receiving a second output from the neural network;
wherein determining the candidate transcription for the utterance is based on at least the output of the neural network and the second output of the neural network.

9. A system comprising:
one or more computers and one or more storage devices storing instructions that are operable, when executed by the one or more computers, to cause the one or more computers to perform operations comprising:
receiving a feature vector that models audio characteristics of a portion of an utterance;
receiving data indicative of latent variables of multivariate factor analysis;
providing the feature vector and the data indicative of the latent variables as input to an input layer of a neural network comprising the input layer, multiple hidden layers, and an output layer; and
determining a candidate transcription for the utterance based on at least an output of the neural network that the neural network provides at the output layer in response to the feature vector and the data indicative of the latent variables being provided at the input layer.

10. The system of claim 9, wherein receiving data indicative of latent variables of multivariate factor analysis comprises receiving data indicative of latent variables of multivariate factor analysis of an audio signal that includes the utterance; and
wherein providing, as input to a neural network, the feature vector and the data indicative of the latent variables comprises providing, as input to a neural network, the feature vector and the data indicative of the latent variables of multivariate factor analysis of the audio signal that includes the utterance.

11. The system of claim 9, wherein the utterance is uttered by a speaker; and
wherein receiving data indicative of latent variables of multivariate factor analysis comprises receiving data indicative of latent variables of multivariate factor analysis of an audio signal that (i) does not include the utterance and (ii) includes other utterances uttered by the speaker.

12. The system of claim 9, wherein receiving data indicative of latent variables of multivariate factor analysis comprises receiving an i-vector indicating time-independent audio characteristics; and
wherein providing, as input to a neural network, the feature vector and the data indicative of the latent variables comprises providing, as input to a neural network, the feature vector and the i-vector.

13. The system of claim 9, wherein the utterance is uttered by a speaker, and the data indicative of latent variables of multivariate factor analysis is first data indicative of latent variables of multivariate factor analysis;

wherein the operations further comprise:
determining that an amount of audio data received satisfies a threshold;
in response to determining that the amount of audio data received satisfies the threshold, obtaining second data indicative of latent variables of multivariate factor analysis, the second data being different from the first data;
providing, as input to the neural network, a second feature vector that models audio characteristics of a portion of a second utterance and the second data; and
determining a candidate transcription for the second utterance based on at least a second output of the neural network.

14. The system of claim 9, wherein providing, as input to a neural network, the feature vector and the data indicative of the latent variables comprises providing the feature vector and the data indicative of the latent variables to a neural network trained using audio data and data indicative of latent variables of multivariate factor analysis corresponding to the audio data;
wherein determining the candidate transcription for the utterance based on at least an output of the neural network comprises:
receiving, as an output of the neural network, data indicating a likelihood that the feature vector corresponds to a particular phonetic unit; and
determining the candidate transcription based on the data indicating the likelihood that the feature vector corresponds to the particular phonetic unit.

15. The system of claim 9, wherein the operations further comprise:
recognizing a first portion of a speech sequence by providing a feature vector to an acoustic model that does not receive data indicative of latent variables of multivariate factor analysis as input; and
after recognizing the first portion of the speech sequence, determining that at least a minimum amount of audio of the speech sequence has been received;
wherein:
the utterance occurs in the speech sequence after the first portion;
receiving data indicative of latent variables of multivariate factor analysis comprises receiving data indicative of latent variables of multivariate factor analysis of received audio including the first portion of the speech sequence; and
providing, as input to a neural network, the feature vector and the data indicative of the latent variables comprises providing the feature vector and the data indicative of the latent variables as input to a neural network that is different from the acoustic model.

16. The system of claim 9, wherein the operations further comprise:
receiving a second feature vector that models audio characteristics of a second portion of the utterance;
providing, as input to a neural network, the second feature vector and the data indicative of the latent variables; and
receiving a second output from the neural network;
wherein determining the candidate transcription for the utterance is based on at least the output of the neural network and the second output of the neural network.

17. A non-transitory computer-readable storage device encoded with a computer program, the program comprising instructions that when executed by one or more computers cause the one or more computers to perform operations comprising:
receiving a feature vector that models audio characteristics of a portion of an utterance;
receiving data indicative of latent variables of multivariate factor analysis;
providing the feature vector and the data indicative of the latent variables as input to an input layer of a neural network comprising the input layer, multiple hidden layers, and an output layer; and
determining a candidate transcription for the utterance based on at least an output of the neural network that the neural network provides at the output layer in response to the feature vector and the data indicative of the latent variables being provided at the input layer.

18. The non-transitory computer-readable storage device of claim 17, wherein receiving data indicative of latent variables of multivariate factor analysis comprises receiving data indicative of latent variables of multivariate factor analysis of an audio signal that includes the utterance; and
wherein providing, as input to a neural network, the feature vector and the data indicative of the latent variables comprises providing, as input to a neural network, the feature vector and the data indicative of the latent variables of multivariate factor analysis of the audio signal that includes the utterance.

19. The non-transitory computer-readable storage device of claim 17, wherein the utterance is uttered by a speaker; and
wherein receiving data indicative of latent variables of multivariate factor analysis comprises receiving data indicative of latent variables of multivariate factor analysis of an audio signal that (i) does not include the utterance and (ii) includes other utterances uttered by the speaker.

20. The non-transitory computer-readable storage device of claim 17, wherein receiving data indicative of latent variables of multivariate factor analysis comprises receiving an i-vector indicating time-independent audio characteristics; and
wherein providing, as input to a neural network, the feature vector and the data indicative of the latent variables comprises providing, as input to a neural network, the feature vector and the i-vector.

* * * * *

UNITED STATES PATENT AND TRADEMARK OFFICE
CERTIFICATE OF CORRECTION

| | |
|---|---|
| PATENT NO. | : 10,438,581 B2 |
| APPLICATION NO. | : 13/955483 |
| DATED | : October 8, 2019 |
| INVENTOR(S) | : Senior et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1257 days.

Signed and Sealed this
Thirtieth Day of June, 2020

Andrei Iancu
*Director of the United States Patent and Trademark Office*